May 8, 1951 G. W. EWING 2,551,833
RECORDING SPECTROPHOTOMETER
Filed Sept. 27, 1947
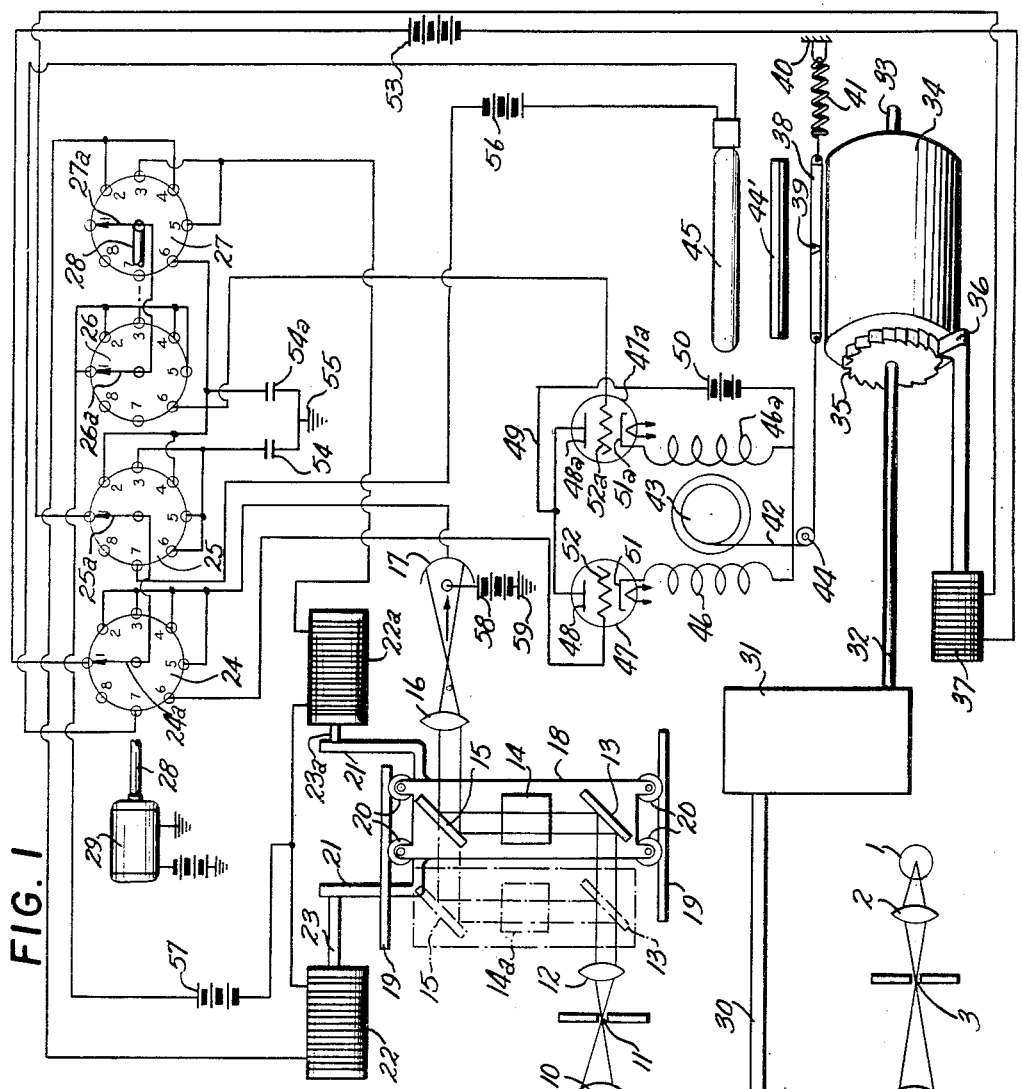
INVENTOR
GALEN W. EWING
BY
Albert J. Jacobs
ATTORNEY Patented May 8, 1951

2,551,833

UNITED STATES PATENT OFFICE 2,551,833

RECORDING SPECTROPHOTOMETER

Galen W. Ewing, Schenectady, N. Y., assignor to Sterling Drug Inc., Wilmington, Del., a corporation of Delaware Application September 27, 1947, Serial No. 776,519

9 Claims. (Cl. 346—33)

The present invention relates to spectrophotometry and is more particularly concerned with a recording spectrophotometer adapted for use throughout the whole range of visible and ultraviolet light.

Spectrophotometric equipment now available has certain recognized drawbacks. It is either limited to use within the visible range of wave lengths of light or is not of the recording type. Spectrophotometers are also known which operate in the infrared range of the spectrum, but these, however, are not pertinent to the present invention because the techniques which must be used are entirely different. Insofar as the prior patent literature describes recording spectrophotometers, such involves the use of polarized light as an essential part of their operation, but polarized light cannot be conveniently used by any known means in the ultra-violet region of the spectrum.

One of the objects of the present invention is to provide an automatic recording spectrophotometer which can be used throughout the entire range of visible and ultra-violet light.

Another object of the invention resides in means for converting the variations in transmitted light into mechanical movements which control the operation of a recording device.

A further object of the invention involves the provision of means whereby sample and blank solutions can be inserted into the optical path of the spectrophotometer and moved as a unit in a horizontal, reciprocating path parallel to the principal optical axis of the spectrophotometer.

Other and further objects and advantages will be apparent from the various combinations, subcombinations and elements hereinafter described and claimed and in such other and further features as will be appreciated by those skilled in this art.

My invention is most conveniently described by reference to the accompanying drawing which illustrates a preferred embodiment of the invention. In the drawing, Fig. 1 illustrates in a schematic and diagrammatic manner a recording spectrophotometer responding to the present invention and Fig. 2 illustrates a typical graph or curve produced by the operation of the invention.

The lower left-hand portion of Fig. 1 illustrates a known form of monochromator by means of which light from a suitable source is transformed into light of a single color or wave length prior to the utilization of such monochromatized light in the present spectrophotometer. The details of the monochromator per se form no part of the present invention and will therefore be described only briefly.

In the monochromator unit the numeral 1 indicates any suitable source of light which is condensed by a condensing lens 2 and thus focused on a slit 3. Beyond slit 3 the light is collected by collimating lens 4 and the emergent parallel light rays pass through prism 5, after which they are focused by the lens 6 on the monochromator mirror 7. The light reflected from mirror 7 is collected and again rendered parallel by collimating lens 8 following which it passes through prism 9 and is focused by lens 10 on slit 11, beyond which the light is again collected by a collimating lens 12 and the emerging parallel light rays impinge against and are reflected from mirror 13, as shown. From mirror 13 the light passes alternately through the absorption cell 14 and through absorption cell 14a containing the sample and blank solutions respectively and impinges against and reflects from mirror 15 from which it travels through focusing lens 16 to strike upon the active surface of the photocell 17.

From the drawing it will be appreciated that mirrors 13 and 15 are mounted upon a reciprocable carriage 18 movable back and forth along guide rails 19 by means of casters or wheels 20. The upper end of the carriage 18 is provided with an armature 21 disposed between the solenoids 22 and 22a, the electrical connection and operation of which will be hereinafter described. It will be observed that by means of this arrangement carriage 18 can be shifted in accordance with the electrical condition of the solenoids 22 and 22a and the consequent positions of their cores 23 and 23a, respectively, which are attached to the armature 21.

The sequence of steps for the operation of my new spectrophotometer is governed by the four rotatable switch sections 24, 25, 26 and 27, reading from left to right in Fig. 1, each of which has a plurality of switching positions schematically designated by the contact points indicated at the periphery of the said switch sections and electrically connected in a manner to be described. Each of these switch sections is adapted to be rotated through complete 360 degree arcs punctuated by a number of contact points which are spaced correspondingly in each of the four sections. As shown, each such switch section has eight equally spaced contacts but it is to be understood that the exact number of contacts is not a limitation upon the invention and that the number of switch contact points and the electrical connections and circuits governed by such points may be varied in a manner which will be apparent to those skilled in the art without departing from the essentials and principles of the invention. For the sake of convenience of reference the uppermost contact point of each switch section will be designated as the 1-position with succeeding contact points being numbered from 2 to 8, inclusive, in a clockwise direction (see the small numerals within the circles designating the four switches 24, 25, 26 and 27 in Fig. 1). The rotating arms 24a, 25a, 26a and 27a of the four switch sections are connected to and actuated simultaneously by a common shaft 28 of the motor 29 so that, as the shaft 28 turns, all four of said arms simultaneously make contact with their respective correspondingly numbered contact points, e. g. each arm will pass its respective point 1, 2, 3 etc. at the identical instant. As may be further observed from the drawing, the arms 24a and 25a are provided with a permanent electrical connection between them; likewise, with respect to switch section arms 26a and 27a.

Symmetrically disposed with respect to the axis of the monochromator unit above described is a shaft 30 connected to a power transfer gear reduction box 31 the nature of which is per se known and does not, therefore, constitute a part of the present invention except in the combination described. A shaft 32 is also connected into gear box 31 and is connected with or forms an extension of the axle 33 of drum 34, on the gear box end of which is a ratchet 35. Ratchet 35 is adapted to coact with pawl 36 the movements of which are controlled by a solenoid 37 as shown. Drum 34 is adapted to be covered with sensitized paper and is disposed just below a shutter member 38 which is provided with a central aperture 39. Shutter member 38 is mounted for reciprocal movement and is secured at one end to a stationary member 40 of any suitable character through the medium of a spring 41 which permits the shutter to respond to the movement of cable 42 secured to induction motor 43, a roller 44 being employed to change the direction of cable 42 in the manner illustrated. Clockwise rotational movement of induction motor 43 exerts a pull on cable 42 causing movement of shutter 38 toward the left in Fig. 1 and movements of the shutter in the reverse direction are effected by the spring 41 already mentioned when the motor 43 rotates in the opposite or counterclockwise direction. A cylindrical lens 44' is disposed over the shutter 38 and a suitable source of light 45 is disposed over the lens 44 in the relationship shown in Fig. 1.

Motor 43 is disposed between the coils 46 and 46a which are energized or de-energized in accordance with the electrical condition of the associated triode tubes 47 and 47a. While triode tubes 47 and 47a are shown as separate tubes, it will be apparent that the electrodes of both triodes may be enclosed within the same glass envelope. The plates 48 and 48a of tubes 47 and 47a, respectively, are electrically connected to a common conductor 49 which leads via battery 50 to one end of each of the coils 46 and 46a. The cathodes 51 and 51a of tubes 47 and 47a, respectively, are connected to the other ends of coils 46 and 46a, respectively. The grid 52 of tube 47 is connected to contact point 6 of switch section 24. The grid 52a of tube 47a is connected to contact point 6 of switch section 26. Contact point 1 of switch section 24 is connected via battery 53 to solenoid 37, which solenoid is also connected, as shown, to contact point 1 of switch section 25 to complete its circuit. Contact point 2 of switch section 24 is connected by a suitable conductor to the photocell 17 and contact points 3, 4 and 5 of switch section 24 are connected to the same conductor. It is also clear that tetrode and pentode tubes can equally well be employed by the addition of extra grids.

Condensers 54 and 54a are connected to a common ground 55. Contact points 2 and 4 of switch section 25 and contact point 6 of switch section 27 are connected to condenser 54a, and contact points 3, 5 and 6 of switch section 25 are connected to condenser 54. Contact point 7 of switch section 25 is connected via battery 56 to the light source 45, the circuit of which is completed by being connected to contact point 7 of switch section 24. Solenoid 22 is connected to contact points 2 and 4 of switch section 27 and solenoid 22a is connected to contact points 3 and 5 of switch section 27. The circuits of solenoids 22 and 22a are completed by being connected to a single conductor which, via battery 57, is connected to contact points 1, 2, 3, 4 and 5 of switch section 26. However, it is not intended that either solenoid 22 or 22a should be energized when the switching arms 24a, 25a, 26a and 27a pass contact points 1. In this position only switches 24 and 25 close any circuit, namely, that of solenoid 37 which operates the drum 34 and the monochromator mirror 7. It will be apparent to those skilled in the art that the same circuits may be made by suitable rearrangement of the connections involving the switch sections 24, 25, 26 and 27, all of which fall within the scope of the invention.

In the operation of the spectrophotometer, monochromated light from light source 1, after passing through the monochromator unit, ultimately impinges upon the light-sensitive surface of photocell 17, causing a current to flow through the photocell circuit from the associated battery 58, grounded at 59. In referring to batteries it is to be understood that the same is intended to designate any suitable source of electrical current and that sources other than storage batteries may be employed, such as for example power-operated rectifiers. The current from the photocell circuit serves to charge alternately the condensers 54a and 54 in accordance with the circuits closed by switch sections 24 and 25, the switching sequence as illustrated being such that when the cell 14 is interposed in the light beam from the monochromator unit the left-hand condenser 54 is charged and when the light passes through cell 14a, the right-hand condenser 54a is charged. Thus both condensers become charged and their charges are controlled by the transmissivity of the liquids in the cells 14 and 14a, respectively. After they are charged the condensers 54 and 54a are simultaneously connected to the grids 52 and 52a respectively of the triode tubes 47 and 47a when the arms of switches 24 to 27 are on their respective contacts number 6 and the charges thus impressed upon these grids control the currents which are passed by the respective tubes at that instant. The tube currents originate in battery 50 and flow through the symmetrically disposed coils or windings 46 and 46a of the motor 43 which is accordingly caused to move in one direction or the other depending upon the net effect of the current. It will thus be understood that the motion of motor 43 is controlled by the relative transmissivity of the samples in cells 14a and 14 for each wave length of light passed therethrough by the monochromator unit, and that motion of motor 43 correspondingly rotates a pulley wheel attached to the shaft of the motor and around which cable 42 passes, ultimately being connected to shutter 38. Cable 42 is of nonstretchable material and the arrangement is such that backlash is avoided. As cable 42 is shortened, shutter 38 is moved to the left in Fig. 1 extending spring 41 in so doing, and spring 41 contracts to retract the shutter 38 as soon as tension no longer exists in cable 42. Light from light source 45 passes through a suitable lens such as cylindrical lens 45' and impinges upon sensitized paper disposed upon the drum 34 through slit 39 in shutter 38, the lens being of such character as to direct the light upon the sensitized paper. The drum is caused to rotate incrementally by the action of pawl 36 on the ratchet 35. Pawl 36 is driven and controlled electro-magnetically through the switching mechanism described. Drum 34 is also coupled to the monochromator unit and the moving mirror assembly by means of shafts 30 and 32 and intermediate gear box mechanism 31, thus correlating and synchronizing the entire mechanism. While not so shown for lack of space, it is understood that lamp 45, cylindrical lens 44' and shutter mechanism 39 are long enough to extend over the whole length of the drum 34.

As previously indicated the sequence of operations is controlled by the four rotary switch sections above described which are rotated at a slow and essentially constant speed. This speed should be such that the condensers 54 will be discharged soon enough after they are charged that practically no charge will be lost by leakage, and should be slow enough so that the condensers will have had enough time to build up their maximum charges before they become disconnected from the photo-cell. The optimum speed can readily be determined for any given set-up.

As indicated above, the switch sections are so constructed and arranged with relation to their common drive means that the rotating contacts of such switch sections are all in contact with points 1 at the same time, then move to points 2 and make contact therewith all at the same time, through an endless sequence through number 8-position of each switch section and recommencing with points 1, seriatim. It will be noted that contact points 8 are blanks in the form of the switches illustrated and that the rotating contacts move to position 1 for each switch section, thus closing the circuits through switch sections 24 and 25, solenoid 37 and battery 53. This causes ratchet 35 to move one notch, thus turning recording drum 34 a proportional amount. At the same time monochromator mirror 7 moves a corresponding amount. The rotating contacts next move to position 2 of each switch section, whereupon the carriage 18 is moved to the left by the energization of solenoid 22 and battery 57 connected through switch sections 26 and 27 which are electrically connected to each other as shown. At the same time through switch sections 24 and 25, which are similarly electrically connected to one another, the photoelectric cell 17 is connected to right-hand condenser 54a allowing this condenser to charge. At position 3 both mechanisms are reversed, i. e., the carriage 18 is moved to the right and the photocell 17 is connected to the left-hand condenser 54. Position 4 duplicates position 2 and position 5 repeats position 3, and these repetitions are intended to insure that the full charge is impressed upon the condensers, but positions 4 and 5 may be eliminated. As the contacts move to position 6 condensers 54 and 54a become respectively connected electrically to the grids of left- and right-hand triode tubes 47 and 47a to which they therefore communicate their respective charges. The tetrode or pentode tubes immediately pass current as determined by the potentials of their grids 52 and 52a and motor 43 responds, moving in a direction and to an extent which is determined ultimately by the relative transmissivity of the samples in cells 14a and 14. As soon as shutter 38 is moved into proper position the switches turn to position 7 which through switch sections 24 and 25 closes the circuit containing the light source 45 and battery 56 thus causing a spot of light to fall upon the light-sensitive paper on drum 34 in a position which is determined along one coordinate by the wave length position of the monochromator control and along the other coordinate by the relative transmissivity of the samples in the cells 14a and 14. This completes one cycle of operations and the mechanism is ready to choose the next successive wave length of light and respond thereto. The photographic record so obtained is in the form of a series of discrete spots A or A' as shown in Fig. 2, which may be connected if it is desired to form a graph.

While one specific form of recording device has been illustrated and described it will be apparent that other suitable recording devices may be provided. For example, a recorder of the pen type may be provided by substituting a pen or stylus for the shutter 38 and by substituting for lamp 45 an electro-magnetic device suitably connected to bring the pen or stylus in contact with the paper on drum 34 when current is caused to flow in the circuit containing battery 56. In such an arrangement it will be obvious that lens 44 will be unnecessary and that the photo-sensitive paper on drum 34 will be replaced by paper suitable for use with a pen or stylus.

Since various modifications and changes may be made in the apparatus specifically illustrated in Fig. 1 without departing from the spirit or principles hereof, it will be appreciated that the foregoing is intended in an illustrative and not in a limiting sense. The invention is rather that defined by the appended claims.

I claim:

1. In combination, in a recording spectrophotometer adapted for use throughout the visible and ultraviolet light range, a reciprocable carriage, angularly-set mirrors mounted on said carriage and movable therewith, an armature associated with said carriage and forming a part thereof, solenoids contiguous to said armature and having cores electromagnetically operating and controlling said armature, whereby energization of one solenoid effects movement of the carriage in one direction and energization of the other solenoid effects movement of the carriage in the opposite direction.

2. In combination with a source of light and a monochromator, a carriage reciprocating between two alternative stations, said carriage containing means for passing substantially all of a selected wavelength component of said light from the monochromator alternately in one station and then in the other through a medium to be tested and through a control medium respectively, a photo-electric cell, means to collect the light which passes through said media and to direct it to said photoelectric cell, electrically operated means to move the carriage into its alternative stations, an electrical power source connectible in circuit with said electrically operated means, a second electrical power source connectible in series with the photo-electric cell, a pair of condensers alternately connectible in series with said second power source and photo-electric cell, a pair of vacuum tubes, each having a cathode, a grid, and an anode, the grid of each said tube being connectible in a circuit across one of the condensers, said tubes also having their anodes connected together, a pair of symmetrically disposed coils, each of which is connected at one end with one of the cathodes and both of which, at their other ends are connected together, a third power source between the common coil connection and the tube anodes, a rotatable drum having sensitized paper thereon, said drum being advanced in synchronization with the monochromator and said paper being provided with calibrated coordinates, a switchable light source in the vicinity of said drum, a movable shutter interposed between said light source and said drum and shielding the latter from the light source, said shutter having an aperture through which light from said latter mentioned source may be directed against the sensitized paper on the drum, a reversible rotor element driven by said coils and responsive to current flow therein, said rotor element being mechanically associated with said shutter to impart positioning motion to said shutter over said drum in response to the net effect of the current flow in the coils resulting from the impression of the respective charges of the condensers on the grids of the tubes, and a motor driven series of rotary switches having commonly driven rotating contact arms, said switches each having a plurality of contact points, the said arms and the said contact points providing means for sequentially effecting the connections to the aforesaid connectible elements in a predetermined cycle whereby as the monochromator passes each different wavelength component of the light, the electrically operated means moves the carriage first to one of its two stations and then to the other and while in each of said stations, the said second power source is connected through the photoelectric cell to charge respectively first one and then the other of the said condensers, and immediately thereafter said second power source is disconnected and the condensers are further connected in circuit simultaneously with the grids of both vacuum tubes thereby permitting current to flow in said tubes from said third power source and through said coils to position the apertured shutter at which time said rotary switches momentarily turn on the light source in the vicinity of the drum and with the passage of light through the aperture a measurable mark is made upon the sensitized paper, the drum then being advanced a predetermined distance, and said sequence being repeated for each subsequent wavelength of light emitted by the monochromator.

3. In combination with a source of light and a monochromator, a carriage reciprocating between two alternative stations, said carriage containing means for passing substantially all of a selected wave length component of said light from the monochromator alternately in one station and then in the other through a medium to be tested and through a control medium respectively, a photoelectric cell, means to collect the light which passes through said media and to direct it to said photoelectric cell, a pair of solenoid cores opposingly engaging said carriage, electrically operated means to move the carriage into its alternative stations, an electrical power source connectible in circuit with said electrically operated means, a second electrical power source connectible in series with the photoelectric cell, a pair of condensers alternately connectible in series with said second power source and photoelectric cell, a pair of vacuum tubes, each having a cathode, a grid, and an anode, the grid of each said tubes being connectible in a circuit across one of the condensers, said tubes also having their anodes connected together, a pair of symmetrically disposed coils, each of which is connected at one end with one of the cathodes and both of which, at their other ends are connected together, a third power source between the common coil connection and the tube anodes, mechanical means for graphically registering an indication of the relative transmissivity of said media, a reversible rotor element driven by said coils and responsive to current flow therein, said rotor element providing means for actuating said mechanical means in response to the net effect of the current flow in the coils resulting from the impression of the respective charges of the condensers on the grids of the tubes, and a motor driven series of rotary switches having commonly driven rotating contact arms, said switches each having a plurality of contact points, the said arms and the said contact points providing means for sequentially effecting the connections to the aforesaid connectible elements in a predetermined cycle whereby as the monochromator passes each different wave length component of the light, the carriage is moved first to one of its two stations and then to the other through the actuation of said electrically operated means, and while in each of said stations, the said second power source is connected through the photoelectric cell to charge respectively first one and then the other of the said condensers and immediately thereafter said second power source is disconnected and the condensers are further connected in circuit simultaneously with the grids of both vacuum tubes thereby permitting current to flow in said tubes from said third power source and through said coils to operate the rotor element and hence said mechanical means to effect registration of an indication of the transmissivity of said media, and said sequence being repeated for each subsequent wave length of light emitted by the monochromator.

4. In a recording spectrophotometer adapted for use throughout the visible and ultraviolet light range and which employs means to pass substantially all of the monochromatic light from a source alternately through a sample medium and a control medium, and means for recording the relative transmissivity of said media, means for converting the intensity of light passing through such media into mechanical work in an amount commensurate with the transmissivity of said media comprising photoelectric means to receive the monochromatic light passed through said media, a power source in series with said photoelectric means, a pair of condensers alternately connectible with said photoelectric means and power source and chargeable thereby, a pair of vacuum tubes, each having a cathode, a grid, and an anode, the grid of each said tubes being connectible in a circuit across one of the condensers to effect the discharge thereof, said tubes also having their anodes connected together, a pair of symmetrically disposed coils, each of which is connected at one end with one of the cathodes and both of which, at their other ends are connected together, a second power source between the common coil connection and the tube anodes, a reversible rotor element driven by said coils and responsive to current flow therein, said rotor element thereby providing mechanical means for actuating the said recording means in response to the net effect and direction of current flow in the coils and rotary switching means to effect the connections and disconnections of the foregoing elements in a predetermined cycle.

5. In a spectrophotometer adapted for use throughout the visible and ultraviolet light range and which employs a monochromator to provide a source of monochromatic light and apparatus to pass substantially all of said light alternatively through a sample medium and a control medium and photoelectric means to receive and convert the light passing through said media into electrical charges, means for causing said charges to make a visible record in terms of the wave lengths and percentage of transmission comprising a pair of condensers to receive alternately the charges from said photoelectric means, a pair of vacuum tubes each having a cathode, a grid and an anode, the grid of each said tubes being connectible in a circuit across one of the condensers to effect the discharge thereof, said tubes also having their anodes connected together, a pair of symmetrically disposed coils, each of which is connected at one end with one of the cathodes and both of which, at their other ends are connected together, a power source between the common coil connection and the tube anodes, a rotatable drum having sensitized paper thereon, an electromagnetically operated ratchet and pawl to effect incremental rotation of the drum in synchronization with the monochromator at predetermined intervals, the said paper being provided with calibrated coordinates, a switchable light source in the vicinity of said drum, a movable shutter interposed between said light source and said drum and shielding the latter from the light source, said shutter having an aperture therein through which light from said latter mentioned source may be directed against the sensitized paper on the drum, a reversible rotor element driven by said coils in response to current flow therein, said rotor element being mechanically associated with said shutter to position said shutter over said drum in response to the net amount and direction of current flow in the coils resulting from the impression of the respective condenser charges upon the grids of the tubes, and rotary switching means to effect in a predetermined cycle the connections of the photoelectric means with the condensers to effect charging thereof and disconnection of said photoelectric means from said condensers, and the connection of the thus-charged condensers with the grids of the said tubes, and after the positioning of the apertured shutter by the action of the rotor element, to switch on momentarily the light source adjacent thereof, said switching means thereafter further operating the monochromator and advancing the drum and repeating the foregoing sequence for each subsequent wave length of light emitted by the monochromator.

6. A recording spectrophotometer adapted for use throughout the visible and ultraviolet light range comprising a source of light, a monochromator, a carriage capable of reciprocal movement, reflecting means mounted on said carriage and arranged to direct substantially all of the light of each successive wave length emitted from the monochromator alternately through a standard and a sample, means for electromagnetically controlling the reciprocal movements of said carriage, a photoelectric device, and power source therefor adapted to receive such monochromated and reflected light and to pass voltage charges in accordance with the intensity of light received therein, a pair of condensers adapted to be alternately connected with the photoelectric device and power source and to be charged by the said voltage charges, a pair of vacuum tubes each having a cathode, a grid and an anode and each of which tubes is connectible to discharge one of said condensers through the grid circuit of said tube with consequent effect upon the flow of current in the anode circuit of said tube, a source of power for said vacuum tubes, an induction motor in the cathode circuits of said tubes responsive to the net amount and direction of current flowing therein and recording means responsive to such movements of said motor.

7. A recording spectrophotometer adapted for use throughout the visible and ultraviolet light range comprising a source of light, a monochromator adapted to transmit monochromatic light from the light source, a movable carriage, reflecting means mounted upon said carriage and adapted to direct substantially all of the monochromatic light alternately through a standard and a sample, electromagnetic means for moving said carriage and thereby said reflecting means, a photoelectric device arranged to receive light transmitted alternately through the standard and the sample and to convert the intensity of light received into a voltage charge, electronic means for converting the voltage charge emitted from said photoelectric device into mechanical movement, said means comprising a pair of condensers alternately charged by said photoelectric device, a pair of vacuum tubes in circuit each having a cathode, a grid and an anode and each of which tubes is connectible to discharge one of said condensers through the grid circuit of said tube with consequent effect upon the flow of current in the anode circuit, and an induction motor connected in the cathode circuit of said tubes responsive to the net amount and direction of current flowing therein, recording means responsive to such movements of said motor, and rotary switching means for controlling in a predetermined cycle the operation of said monochromator, said movable carriage, said photoelectric device, said electronic means and said recording means.

8. In combination a monochromator providing a source of monochromatic light, electromagnetic means for directing substantially all of the light from said source alternately through a sample medium and a control medium, a photoelectric device arranged to receive the light transmitted through the standard and the sample and to generate a voltage charge proportional to the quantity of light thus received, a pair of electric capacitors alternately connectable with said photoelectric device to be charged separately by the voltages generated in said device as a result of the alternate passage of the said light through the sample and the control medium, a differential circuit connectible to discharge said capacitors simultaneously whereby the difference, if any between the voltage charges of the capacitors is converted to proportional mechanical movement, and a rotary multi-point switching device to coordinate in a predetermined cycle said monochromator, said electromagnetic means and the connecting and disconnecting of said capacitors first to said photoelectric device and then to said differential circuit.

9. In combination, a source of monochromatic light, a carriage reciprocating between two stations both lying within the path of said light, said carriage containing a pair of mirrors disposed apart from each other, said mirrors being so aligned that the said light striking the first of said mirrors is reflected to the second, a control medium and a sample medium disposed in the path of the light passing between said mirrors in each of the two stations respectively, a photoelectric device to receive the light reflected to and from the second mirror in both stations of the carriage and to generate a voltage charge proportional to the quantity of light thus received, electromagnetic means to effect reciprocation of the carriage between said stations, a pair of electric capacitors alternately connectable with said photoelectric device to be charged separately by the voltages generated in said device as a result of the alternate passage of the said light through the sample and the control medium, a differential circuit connectible to discharge said capacitors simultaneously whereby the difference, if any between the voltage charges of the capacitors is converted to proportional mechanical movement, and a rotary multi-point switching device to coordinate in a predetermined cycle said monochromator, said electromagnetic means and the connecting and disconnecting of said capacitors first to said photoelectric device and then to said differential circuit.

GALEN W. EWING.

REFERENCES CITED

The following references are of record in the file of this patent:

UNITED STATES PATENTS

| Number | Name | Date |
|---|---|---|
| 1,746,525 | Darrah | Feb. 11, 1930 |
| 2,176,013 | Pineo | Oct. 10, 1939 |
| 2,218,357 | Pineo | Oct. 15, 1940 |
| 2,304,645 | Keeler | Dec. 8, 1942 |
| 2,328,293 | Pineo | Aug. 31, 1943 |
| 2,388,105 | Wilson | Oct. 30, 1945 |